United States Patent [19]

Taniyama et al.

[11] 4,241,116
[45] Dec. 23, 1980

[54] METHOD OF TREATING THE SURFACES OF SHAPED ARTICLES OF POLYCARBONATE RESINS

[75] Inventors: Susumu Taniyama, Toyonaka; Goro Shimaoka, Sakai; Shoichi Inoue, Itami, all of Japan

[73] Assignee: Mitsubishi Gas Chemical Company, Inc., Tokyo, Japan

[21] Appl. No.: 76,802

[22] Filed: Sep. 17, 1979

[30] Foreign Application Priority Data

Sep. 19, 1978 [JP] Japan ................................. 53/114857

[51] Int. Cl.³ .............................................. B05D 3/02
[52] U.S. Cl. ....................................... 427/386; 427/387; 427/407.1; 427/412.1; 427/412.5; 427/420; 427/421; 427/428; 427/429; 427/430.1; 428/412; 428/413; 525/443; 525/446
[58] Field of Search ............... 427/302, 333, 386, 387, 427/407.1, 412.5, 412.1, 421, 420, 428, 429, 430.1; 428/412, 413; 525/443, 446

[56] References Cited

U.S. PATENT DOCUMENTS

| | | | |
|---|---|---|---|
| 3,425,974 | 2/1969 | Semroc | 525/443 X |
| 3,919,150 | 11/1975 | Kiel et al. | 525/100 X |
| 3,935,346 | 1/1976 | Stengle et al. | 428/412 X |
| 4,056,208 | 11/1977 | Prejean | 427/387 X |
| 4,082,894 | 4/1978 | Yoshida | 428/412 X |
| 4,103,065 | 7/1978 | Gagnon | 427/387 X |
| 4,167,537 | 9/1979 | Taniyama et al. | 525/443 |

*Primary Examiner*—Ralph S. Kendall
*Assistant Examiner*—Thurman K. Page
*Attorney, Agent, or Firm*—Wenderoth, Lind & Ponack

[57] ABSTRACT

A method of treating the surface of a shaped article of a polycarbonate resin, which comprises coating the shaped article of the polycarbonate resin with a specific pre-treating solution (I), air-drying the coated article, then coating the article with a specific coating composition (II), and heat-curing the coated article. The pre-treating solution (I) contains a bisphenol type epoxy resin in a mixed solvent of a lower alcohol and an alkyl ether of ethylene glycol, and the coating composition (II) comprises (A) a reaction mixture of an aminoalkylalkoxy silane of the formula (1) with an epoxyalkylalkoxy silane of the formula (2); (B) a mixture of an alkyl-modified methylol melamine of the formula (3) with an alkyd resin; and (C) an acrylic acid derivative of the formula (5) or its polymer of a low degree of polymerization, the formulas (1), (2), (3) and (5) being given in the claim.

3 Claims, No Drawings

METHOD OF TREATING THE SURFACES OF SHAPED ARTICLES OF POLYCARBONATE RESINS

BACKGROUND OF THE INVENTION

This invention relates to a method of treating the surfaces of shaped articles of polycarbonate resins to make the surfaces free of scratches.

Transparent plastic articles, for example, shaped articles of polycarbonate, poly(methyl methacrylate), cellulose butyrate, polyvinyl chloride and polystyrene, have heretofore been considered useful in many applications as glass substitutes because of their transparency and light weight. They have had the defect, however, that they can be put to only limited applications because they are susceptible to scratch and tend to lose transparency. To remove this defect, a method has been suggested which involves coating a transparent paint on the surface of the transparent plastic article to form a protective film.

In U.S. patent application Ser. No. 869,863 filed on Jan. 16, 1978 now U.S. Pat. No. 4,167,537, the present inventors provided a paint which comprises an amino-containing silane derivative, an epoxy-containing silane derivative, a melamine-alkyd resin, and an acrylic acid derivative, which can be applied to various transparent plastic articles, and which can satisfy both scratch resistance and durability. This paint was superior in adhesion, scratch resistance, and durability in dipping tests using warm water and was by far superior to conventional paints in weatherability as well, but posed the problem in storage stability that its viscosity increased during a relatively short period of time and finally the paint as a whole gelled.

In an attempt to solve the problem in storage stability of that paint, the present inventors traced the causes, and found that melamine being a component of the paint easily reacts with another component, a reaction mixture of the reaction of an amino-containing silane derivative with an epoxy-containing silane derivative, thereby causing the increase in the viscosity of the paint and its gelation. To improve the storage stability of the paint to a level which would cause no trouble to its actual use (one month or longer, if the storage stability is expressed by a period), the melamine content of the melamine-alkyd resin must be set at less than 10 wt%. The melamine content of the melamine-alkyd resin set at less than 10 wt%, however, has resulted in a marked reduction in the hot water resistance of the resulting coated film.

The present inventors made eager studies on improving the storage stability of the paint disclosed in U.S. patent application Ser. No. 869,863 now U.S. Pat. No. 4,167,537, and on a method capable of maintaining on a high level the durability of an article coated with the improved paint. These studies lead them to the present invention.

SUMMARY OF THE INVENTION

The present invention provides a method of treating the surface of a shaped article of a polycarbonate resin, which comprises coating a shaped article of a polycarbonate resin with (I) a pre-treating solution containing a bisphenol type epoxy resin in a concentration of 5 to 50 wt% in a mixed solvent of a lower alcohol and an alkyl ether of ethylene glycol; air-drying the coated article; then coating the article with (II) a coating composition comprising (A) a reaction mixture of the reaction of an aminoalkylalkoxy silane of the general formula

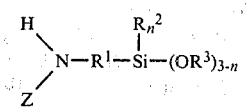

wherein $R^1$ represents a divalent hydrocarbon group containing 1 to 4 carbon atoms, $R^2$ and $R^3$ represent a monovalent hydrocarbon group containing 1 to 4 carbon atoms, Z represents a hydrogen atom or an aminoalkyl group, and n is 0 or 1, with an epoxyalkylalkoxy silane of the general formula

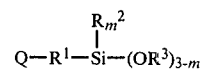

wherein $R^1$, $R^2$ and $R^3$ are as defined above, Q representa a glycidoxy group or an epoxycyclohexyl group, and m is 0 or 1, (B) a mixture of 10 to 0 wt% of an alkyl-modified methylol melamine of the general formula

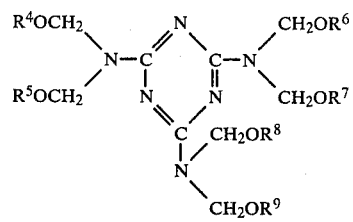

wherein $R^4$, $R^5$, $R^6$, $R^7$, $R^8$ and $R^9$ represent a hydrogen atom or a monovalent hydrocarbon group with 1 to 4 carbon atoms, and 90 to 100 wt% of an alkyd resin 4, and (C) an acrylic acid derivative of the general formula

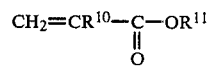

wherein $R^{10}$ represents a hydrogen atom or a methyl group, and $R^{11}$ represents a hydrogen atom, a hydrocarbon group containing 1 to 4 carbon atoms, a hydroxyalkyl group or a glycidyl group, or its polymer of a low degree of polymerization, the content of the component (A) being 45 to 100 wt% and the content of the component (B) being 55 to 0 wt% in the mixture of the components (A) and (B), and the content of the component (C) in the composition of the components (A), (B) and (C) being 5 to 30 wt%; and heat-curing the coated article.

DETAILED DESCRIPTION OF THE INVENTION

The pre-treating solution (I) of the present invention will be first described below.

The solvent of the pre-treating solution (I) of the present invention is a mixed solvent of a lower alcohol such as methanol or ethanol, and an alkyl ether or ethylene glycol such as ethylene glycol monoethyl ether, ethylene glycol monobutyl ether, ethylene glycol monomethyl ether, ethylene glycol diethyl ether, or ethylene glycol dibutyl ether. Particularly preferred is a mixed solvent of ethanol and ethylene glycol monoethyl ether. The bisphenol type epoxy resin refers generally to the one produced by condensing a bisphenol with epichlorohydrin, and 2,2-bis-(4-glycidoxyphenyl)-propane or its polymer is particularly preferred. The concentration of the bisphenol type epoxy resin is preferably 5 to 50 wt%, more preferably, 10 to 30 wt%. If the concentration is less than 5 wt%, insufficient effects will result. The concentration exceeding 50 wt% is not preferred, because the appearance of the finished coated film will be impaired by irregularities formed on the surface or for other reasons.

The coating of the pre-treating solution (I) can be performed by a customary method such as dipping, spray coating, brush coating, flow coating, or roll coating. The aforementioned air-drying is intended for evaporating, mainly, the lower alcohol contained in the pre-treating solution (I) to form a highly viscous, solid thin layer of the unreacted, uncured bisphenol type epoxy resin. If this requirement is satisfied, the air-drying may be performed in any manner.

The so formed thin layer of the unreacted, uncured bisphenol type epoxy resin is considered to be partly distributed in the lower part of a layer of the coating composition (II) coated and cured in the subsequent steps, but it is considered that said thin layer is mostly cured together with said coating composition (II) while maintaining a layer form between the shaped article of the polycarbonate resin and the coating composition (II).

Nextly, the coating composition (II) of the present invention is described.

Examples of the aminoalkylalkoxy silane of the general formula 1 are aminomethyltriethoxy silane [NH$_2$CH$_2$Si(OC$_2$H$_5$)$_3$], N-$\beta$-aminoethylaminoethyltrimethoxy silane [NH$_2$CH$_2$CH$_2$NHCH$_2$Si(OCH$_3$)$_3$], $\gamma$-aminopropyltriethoxy silane [NH$_2$CH$_2$CH$_2$CH$_2$Si(OC$_2$H$_5$)$_3$], N-(trimethoxysilylpropyl)-ethylenediamine [NH$_2$CH$_2$CH$_2$NHCH$_2$CH$_2$CH$_2$Si(OCH$_3$)$_3$], and N-(dimethoxymethylsilylpropyl)-ethylenediamine

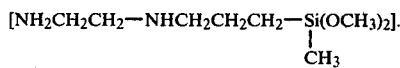

Examples of the epoxyalkylalkoxy silane of the general formula 2 are:

$\gamma$-glycidoxypropyltrimethoxy silane

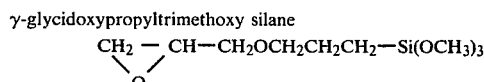

$\beta$-(3,4-epoxycyclohexyl)ethyltrimethoxy siland

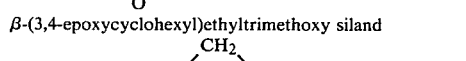

$\gamma$-glycidoxypropylmethyldimethoxy silane

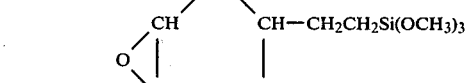

and $\beta$-(3,4-epoxycyclohexyl)ethylmethyldimethoxy silane

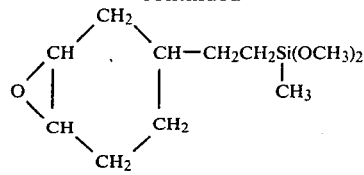

Reaction of the compound 1 with the compound 2 gives the reaction mixture (A), in which the content of the compound 1 is 20 to 70 mol%, and the content of the compound 2 is 80 to 30 mol%, and preferably, the content of the compound 1 is 25 to 55 mol%, while the content of the compound 2 is 75 to 45 mol%.

Examples of the alkyl-modified methylol melamine of the general formula 3 are hexamethylol melamine, methyl-etherified methylol melamine, ethyl-etherified methylol melamine, propyl-etherified methylol melamine, isopropyl-etherified methylol melamine, butyl-etherified methylol melamine, and isobutyl-etherified methylol melamine.

Examples of the alkyd resin 4 include polycondensates formed between polybasic acids such as phthalic acid, isophthalic acid, maleic acid, fumaric acid, azelaic acid, adipic acid and sebasic acid, and polyhydric alcohols such as glycerol, pentaerythritol, trimethylol ethane, sorbitol, trimethylol propane, ethylene glycol, propylene glycol, neopentyl glycol and dipropylene glycol, and products obtained by modifying these polycondensates with various fatty acid esters. Products obtained by modifying these polycondensates with silicones, epoxies, isocyanates or acrylic acid derivatives can also be used.

Examples of the acrylic acid derivative of formula 5 include acrylic acid, methacrylic acid, methyl acrylate, methyl methacrylate, propyl acrylate, butyl acrylate, butyl methacrylate, 2-hydroxyethyl methacrylate, glycidyl methacrylate, and polymers of these with a low degree of polymerization. The polymers with a low degree of polymerization denote low-molecular weight polymers which have miscibility with the mixture of components (A) and (B).

In addition to the above-described components, the coating composition of the present invention, if a melamine-alkyd resin is used, requires a small amount of an aromatic hydrocarbon such as toluene or xylene in order to dissolve the melamine-alkyd resin. However, since the other ingredients are liquid and have good compatibility with the melamine-alkyd resin, no special solvent is required to dissolve and mix the ingredients of the coating composition. When a diluting solvent is required to adjust the coating thickness of the final product, alcohols, ketones and ethers, for example, can be used as the diluting solvent. Of these, alcohols, and alkyl ethers of ethylene glycol are preferred from the viewpoint of preventing corrosion of a plastic article.

The coating composition can be coated by a customary method, such as dipping or spray coating, which will not impair the epoxy resin layer formed from the pre-treating solution (I). In this case, the thickness of the finished coated film is usually 3 to 40$\mu$, preferably 5 to 30$\mu$.

The superior properties of the coated film of the coating composition in accordance with the present invention appear by curing the coated film under heat. Usually, the heat-curing is carried out at a temperature of 100° to 130° C. for 2 to 4 hours. The use of a curing catalyst can promote the curing reaction, and render the heat-curing conditions milder. Examples of such a catalyst are inorganic and organic acids such as phosphoric acid, hydrochloric acid, sulfuric acid, and p-toluenesulfonic acid, and metal salts of organic acids such as cobalt naphthenate, zinc naphthenate and copper naphthenate.

The present invention will be described in greater detail below with reference to the Examples.

EXAMPLES 1 AND 2 AND COMPARATIVE EXAMPLES 1, 2 AND 3

Preparation of pre-treating solution

A bisphenol A type epoxy resin (a product of Shell Chemical Co., trade name Epikote 828) having a molecular wieght of about 330 was dissolved in a mixed solvent of 80 vol% ethanol and 20 vol% ethylene glycol monoethyl ether to concentrations of 10 wt% and 20 wt% to form two pre-treating solutions with varying concentrations.

Preparation of coating composition

A four-necked flask equipped with a reflux device, a thermometer and an agitator was charged with 22.2 g (0.1 mol) N-(trimethoxysilylpropyl)-ethylenediamine, 61.8 g (0.3 mol) N-(dimethoxymethylsilylpropyl)-ethylenediamine, and 94.4 g (0.4 mol) γ-glycidoxypropyltrimethoxy silane, and they were agitated at 100° C. for 1.5 hours. After the agitation, the infrared absorption spectra of the contents were measured. The measurement showed that the absorption band of an epoxy group vanished.

17.0 Grams of the resulting reaction product, 8.5 g of γ-glycidoxypropyltrimethoxy silane, 7.5 g of a soybean oil-modified alkyd resin (phthalic anhydride content 42%, acid value less than 12, specific gravity 0.98–0.99; a product of Dainippon Ink And Chemicals, Incorporated, trade name Beccosol J507), and 7.3 g of n-butyl methacrylate, and further 43.7 g of ethylene glycol monoethyl ether and 7.3 g of ethylene glycol monobutyl ether as solvents were mixed and stirred until the mixture became uniform. Then, water was added in an amount of 0.17 g sufficient to hydrolyze 3% of the total methoxy groups bonded to the silicon atoms contained in the mixture. The resulting mixture was agitated at room temperature (20° to 25° C.) for 2 hours to prepare a coating composition.

A shaped article of a polycarbonate resin was dipped in the aforementioned pre-treating solution to coat it with the solution. Then, the coated article was air-dried at room temperature for 5 to 10 minutes, and was dipped in the aforesaid coating composition for coating purposes, followed by heat-curing the coated article at 130° C. for 4 hours. For comparisons, the same polycarbonate resin articles that had not been coated with the pre-treating solution and that had been coated with the pre-treating solution and then heat-dried at 100° to 120° C. for 5 to 10 minutes were coated with the coating composition and heat-cured under the same conditions as described above. The coated films of the so called articles were tested, and the results are shown in Table 1.

Table 1

| | Pre-treatment | | Initial properties of coated film | | | Appearance after boiling(*1) and adhesion after boiling(*3) | | |
|---|---|---|---|---|---|---|---|---|
| | Epoxy resin concentration (wt%) | Drying conditions | Appearance(*1) | Steel wool test(*2) | Adhesion(*3) | 1 hr. | 3 hr. | 5 hr. |
| Ex. 1 | 10 | 5–10 min. Air-drying | Transparent Good | A | 100/100 | Unchanged 100/100 | Unchanged 100/100 | Unchanged 100/100 |
| Ex. 2 | 20 | 5–10 min. Air-drying | Transparent Good | A'–A | 100/100 | Unchanged 100/100 | Unchanged 100/100 | Unchanged 100/100 |
| Comp. Ex. 1 | 10 | 5–10 min. 120° C. | Slightly cloudy | A' | 100/100 | Slightly cloudy 50/100 | Slightly cloudy 0/100 | — |
| Comp. Ex. 2 | 20 | 5–10 min. 120° C. | Whitened | A'–A | 100/100 | Whitened 50/100 | Whitened 0/100 | — |
| Comp. Ex. 3 | — | — | Transparent Good | A' | 50/100 | Cracks Occurred 0/100 | — | — |

(*1)Appearance: Judged visually.

(*2)Steel wool test: The coated surface was rubbed through 15 reciptocations with #0000 steel wool lightly pressed on the coated surface. The extent of scar on the coated surface was rated in four grades in which:
A' : no scar was formed.
A : virtually no scar was formed.
B : scars were formed, but the coated surface still retained gloss.
C : numerous scars were formed, and the coated surface lost gloss.

(*3)Adhesion: 100 square cuts (1 mm²) were provided on the coated surface. An adhesive cellophane type was caused to firmly adhere to the cut surface, and a peeling force was exerted abruptly at right angles to the tape. The adhesion is expressed by the number of squares which remained unpeeled, with respect to the total number of squares, 100.

EXAMPLE 3

The same epoxy resin as employed in Example 1 was dissolved in a mixed solvent of ethanol and ethylene glycol monoethyl ether to prepare pre-treating solutions having various concentrations. Coated articles were obtained in the same way as in Example 1 with the use of these pre-treating solutions. The results of tests on these articles are shown in Table 2. From the results, it is seen that the preferred concentration of the epoxy resin in the pre-treating solution is in the range of 5 to 50 wt%.

Table 2

| | | Epoxy resin concentration in pre-treating solution (wt%) | | | | | | | |
|---|---|---|---|---|---|---|---|---|---|
| | | 0(*3) | 2 | 5 | 10 | 20 | 30 | 40 | 50 |
| Initial properties | Appearance(*1) | o | o | o | o | o | o | o | Somewhat orange peel |
| | steel wool test | A' | A' | A' | A' | A' | A' | A' | A'–A |
| | Adhesion | 50/100 | 100/100 | 100/100 | 100/100 | 100/100 | 100/100 | 100/100 | 100/100 |
| Appearances after treatment with boiling water(*2) | 1.0 hr. | Δ | o | o | o | o | o | o | o |
| | 1.5 hr. | x | Δ | o | o | o | o | o | o |
| | 2.0 hr. | | x | o | o | o | o | o | o |
| | 3.0 hr. | | | o | o | o | o | o | o |
| | 4.0 hr. | | | Δ | o | o | o | o | o |
| 5.0 hr. | | | x | o | o | o | o | o | |

(*1) Appearance. Judged visually.
o Good
Δ Cracks occurred.
x Coated film peeled off.
(*2) Appearance after treatment with boiling water. The sample was dipped in boiling water at 90° to 100° C., and its appearance after a certain period of time was judged visually.
o Good
Δ Cracks occurred.
x Coated film peeled off.
(*3) Indicates that the pre-treatment was not performed.

EXAMPLES 4 AND 5 AND COMPARATIVE EXAMPLES 4 AND 10

Preparation of pre-treating solution

Each of the various epoxy resins shown in Table 3 was dissolved in ethylene glycol monoethyl ether. Then, ethanol was added to the solution to prepare a pre-treating solution having an epoxy resin concentration of 20 wt% and an ethylene glycol monoethyl ether/ethanol ratio of 80:20 in vol%.

Preparation of coating composition

A four-necked flask equipped with a reflux device, a thermometer, and an agitator was charged with 22.2 g (0.1 mol) of N-(trimethoxysilylpropyl)-ethylenediamine, 61.8 g (0.3 mol) of N-(dimethoxymethylsilyl-propyl)-ethylene-diamine, and 94.4 g (0.4 mol) of γ-glycidoxypropyltrimethoxy silane. The contents were agitated at 100° C. for 1.5 hours, and the reaction was brought to an end. 17.0 Grams of the reaction product, 8.5 g of γ-glycidoxypropyltrimethoxy silane, 7.3 g of a melamine-modified alkyd resin (a product of Dainippon Ink And Chemicals, Incorporated; trade name Beccolite M6401-50), and 7.3 g of n-butyl methacrylate, and 43.7 g of ethylene glycol monoethyl ether and 7.3 g of ethylene glycol monobutyl ether as solvents were mixed and stirred until the mixture became uniform. Further, water was added in an amount of 0.17 g which was sufficient to hydrolyze 3% of the total methoxy groups bonded to the silicon atoms contained in the mixture. The resulting mixture was stirred for 2 hours at room temperature (20° to 25° C.) to obtain a coating composition.

Using the so obtained pre-treating solution and coating composition, coated articles of polycarbonate resin were produced in the same way as in Example 1. (However, the article after coating with the pre-treating solution was air-dried for 5 to 10 minutes. The coating thickness of the finished article was about 10μ.)

These coated articles were subjected to the same boiling water dipping test as in Example 1, and the change in the appearance of the article with the passage of the treating time was judged visually. The results are shown in Table 3. As is apparent from Table 3, the effect of the aliphatic epoxy resin is by far inferior to the effect of the pre-treating solution of the present invention.

Table 3

| | | Initial properties | | | Appearance after treatment with boiling water (*3) | | |
|---|---|---|---|---|---|---|---|
| No. | Epoxy resin used in pre-treatment | Appearance (*4) | Steel wool test | Adhesion | 1 hr. | 3 hr. | 5 hr. |
| Ex. 4 | Low molecular weight bisphenol A type epoxy resin (*1) | o | A' | 100/100 | o | o | o |
| Ex. 5 | High molecular weight bisphenol A type epoxy resin (*2) | o | A' | 100/100 | o | o | o |
| Comp. Ex. 4 | $CH_3-CH_2-C(CH_2OCH_2-\underset{O}{\underset{\diagdown\diagup}{CH-CH_2}})_3$ | o | A' | 100/100 | o | x | x |
| Comp. Ex. 5 | $\underset{O}{\underset{\diagdown\diagup}{CH_2-CHCH_2}}OCH_2\underset{OH}{\underset{|}{CH}}CH_2OCH_2\underset{O}{\underset{\diagdown\diagup}{CH-CH_2}}$ | o | A' | 100/100 | o | x | x |
| Comp. Ex. 6 | $\underset{O}{\underset{\diagdown\diagup}{CH_2CHCH_2}}OCH_2\underset{CH_3}{\overset{CH_3}{\underset{|}{C}}}-CH_2OCH_2\underset{O}{\underset{\diagdown\diagup}{CH-CH_2}}$ | o | A' | 100/100 | o | x | x |
| Comp. Ex. 7 | $\underset{O}{\underset{\diagdown\diagup}{CH_2CHCHO}}(CH_2)_6-OCH_2\underset{O}{\underset{\diagdown\diagup}{CH-CH_2}}$ | Slightly cloudy | A' | 100/100 | o | x | x |
| Comp. Ex. 8 | $\underset{O}{\underset{\diagdown\diagup}{CH_2CHCH_2}}O(CH_2-\underset{CH_3}{\underset{|}{CH}}-O)_3-CH_2CHCH_2$ | o | A' | 100/100 | o | x | x |

Table 3-continued

| No. | Epoxy resin used in pre-treatment | Initial properties | | | Appearance after treatment with boiling water (*3) | | |
|---|---|---|---|---|---|---|---|
| | | Appearance (*4) | Steel wool test | Adhesion | 1 hr. | 3 hr. | 5 hr. |
| Comp. Ex. 9 | $CH_2CHCH_2O+CH_2CH_2O\rightarrow_{y}CH_2CHCH_2$ (with epoxide O's) | o | A' | 100/100 | o | x | x |
| Comp. Ex. 10 | Pre-treatment was not performed | o | A' | 100/100 | Δ~o | x | x |

(*1): Epikote 828, a trade name for a product of Shell Chemical Co., molecular weight about 330
(*2): Epikote 1001, a trade name for a product of Shell Chemical Co., molecular weight about 900
(*3): The sample was dipped in boiling water at 90° to 100° C., and the change in the appearance of the coated film after passage of a predetermined time was visually judged.
    o . . . Unchanged, good
    Δ . . . Cracks occurred
    x . . . Coated film peeled off
(*4): The appearance of the coated film after curing treatment was judged visually.
    o . . . Good
    Δ . . . Cracks occurred
    x . . . Coated film peeled off

EXAMPLE 6

Coated articles were obtained in the same way as in Example 4 with the use of the same pre-treating solution as in Example 4 and the same coating composition as in Example 4 but omitting the melamine-modified alkyd resin from the components of the coating composition. The coated articles were subjected to the same boiling water dipping test as in Example 4. The results were that in the coated article without the application of the pre-treatment, the coated film formed cracks when dipped in boiling water for 30 minutes to 1 hour, and partially peeled off, while in the coated article given the pre-treatment in accordance with the present invention, no change in its appearance was observed even after dipping in boiling water for 3 to 5 hours.

What is claimed is:

1. A method of treating the surface of a shaped article of a polycarbonate resin, which comprises
coating the shaped article of the polycarbonate resin with (I) a pre-treating solution containing a bisphenol type epoxy resin in a concentration of 5 to 50 wt% in a mixed solvent of a lower alcohol and an alkyl ether of ethylene glycol,
air-drying the coated article,
then coating the article with (II) a coating composition comprising
(A) a reaction mixture of the reaction of an aminoalkylalkoxy silane of the general formula

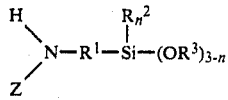
                              1 wherein $R^1$ represents a divalent hydrocarbon group containing 1 to 4 carbon atoms, $R^2$ and $R^3$ represent a monovalent hydrocarbon group containing 1 to 4 carbon atoms, Z represents a hydrogen atom or an aminoalkyl group, and n is 0 or 1, with an epoxyalkylalkoxy silane of the general formula

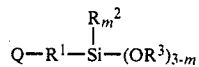
                                  2 wherein $R^1$, $R^2$ and $R^3$ are as defined above, Q represents a glycidoxy group or an epoxycyclohexyl group, and m is 0 or 1, (B) a mixture of 10 to 0 wt% of an alkyl-modified methylol melamine of the general formula

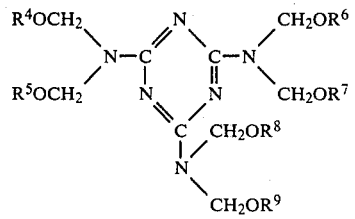
                                  3 wherein $R^4$, $R^5$, $R^6$, $R^7$, $R^8$ and $R^9$ represent a hydrogen atom or a monovalent hydrocarbon group with 1 to 4 carbon atoms,
and 90 to 100 wt% of an alkyd resin 4, and
(C) an acrylic acid derivative of the general formula

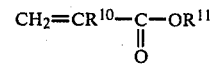
                                  5 wherein $R^{10}$ represents a hydrogen atom or a methyl group, and $R^{11}$ represents a hydrogen atom, a hydrocarbon group containing 1 to 4 carbon atoms, a hydroxyalkyl group or a glycidyl group, or its polymer of a low degree of polymerization, the content of the component (A) being 45 to 100 wt% and the content of the component (B) being 55 to 0 wt% in the mixture of the components (A) and (B), and the content of the component (C) in the composition of the components (A), (B) and (C) being 5 to 30 wt%,
and heat-curing the coated article.

2. The method of claim 1 wherein the reaction mixture (A) is obtained by reacting 20 to 70 mol% of the aminoalkylalkoxy silane of the formula 1 with 80 to 30 mol% of the epoxyalkylalkoxy silane of the formula 2.

3. The method of claim 1 wherein the air-drying forms a thin layer of the unreacted, uncured bisphenol type epoxy resin.

* * * * *